United States Patent Office 3,766,128
Patented Oct. 16, 1973

3,766,128
SILICONE ELASTOMER COMPOSITION CONTAINING AMIDOSILANE AND AMINOSILANE
Sam A. Brady and Joseph N. Clark, Midland, Irvin D. Crossan, Homer Township, Midland County, and Louis H. Toporcer, Ingersoll Township, Midland County, Mich., assignors to Dow Corning Corporation, Midland, Mich.
No Drawing. Filed Sept. 29, 1972, Ser. No. 293,749
Int. Cl. C08g 51/04
U.S. Cl. 260—37 SB
26 Claims

ABSTRACT OF THE DISCLOSURE

A low modulus room temperature vulcanizable silicone elastomer is obtained by curing a mixture of 100 parts by weight of a hydroxyl endblocked polydiorganosiloxane, 0 to 150 parts by weight of a non-acidic, non-reinforcing filler, 2 to 7.5 parts by weight methylvinyldi-(N-methylacetamido)silane and 0.5 to 4 parts by weight of an aminosilane of the formula $RSi(NR'R'')_3$ in which R is alkyl, phenyl or vinyl, R' is hydrogen or alkyl and R" is alkyl or phenyl. The low modulus silicone elastomer is useful in building construction.

---

This invention relates to a room temperature vulcanizable silicon elastomer.

Silicone elastomers cured by an aminosilane have been known for sometime, as shown by Nitzsche et al. in U.S. Pat. No. 3,032,528, but have not found significant commercial success as, for example, the silicone elastomer cured by acetoxy silanes or alkoxy silicon compounds have been commercially accepted. This lack of commercial adaptability is due primarly to a number of serious disadvantages, even though the amino group when split off during curing has the advantage of being less corrosive than acetoxy leaving groups for example. One disadvantage is that the composition will flow out of perpendicular cracks when attempting to use it as a sealing material and if one uses sufficient filler to overcome this flow problem, the consistency is such that the composition cannot be applied from a tube or the mechanical stability is unsatisfactory. This disadvantage is described by Hittmair et al. in U.S. Pat. No. 3,644,434. Hittmair et al. teach that the disadvantage can be overcome by using a certain method of adding the amino organosilicon compounds and a certain mixture of an inorganic filler and alkali metal or alkaline earth metal aluminum silicates having molecular sieve properties. Another disadvantage of the amino cross-linking agents is that the compositions have insufficient storage stability since even trace amounts of water can cause premature crosslinking even under sealed conditions, as described by Gölitz et al. in U.S. Pat. No. 3,364,160. Gölitz et al. teach that their amido silicon crosslinking agent avoids this problem.

The disadvantages observed by prior art compositions are not present in the compositions of the present invention. The compositions defined herein can use large amounts of fillers such as calcium carbonate and still be dispensed from the tube while not flowing out of a perpendicular crack in a building construction. Also, the one package compositions of this invention are storage stable for extended periods of time, such as greater than 9 months.

It is therefore an object of this invention to provide a composition which cures to a low modulus silicone elastomer at room temperature without the foregoing disadvantages. This object and others will become more apparent from the following detailed description of this invention.

This invention relates to a composition which is curable to a silicone elastomer at room temperature consisting essentially of the product obtained by mixing (A) 100 parts by weight of a hydroxyl endblocked polydiorganosiloxane having a viscosity at 25° C. of from 150 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, non-reinforcing filler, (C) 2 to 7.5 parts by weight inclusive methylvinyldi-(N-methylacetamido)silane, (D) 0.5 to 4 parts by weight inclusive of an aminosilane of the general formula $$RSi(NR'R'')_3$$

in which R is a monovalent hydrocarbon radical selected from the group consisting of an alkyl radical having from 1 to 6 carbon atoms inclusive, phenyl and vinyl, R' is a monovalent radical selected from the group consisting of a hydrogen atom and an alkyl radical having from 1 to 6 carbon atoms inclusive, R" is a monovalent hydrocarbon radical selected from the group consisting of an alkyl radical having from 1 to 6 carbon atoms inclusive and phenyl, said aminosilane (D) being present in an amount sufficient enough to provide at least 5 weight percent but not more than 45 weight percent of the total combined weight of (C) and (D), said composition when cured for seven days at 25° C. exposed to an air atmosphere having 50 percent relative humidity results in a silicone elastomer having an elongation of at least 600 percent, a durometer on the Shore A scale of at least 8 and a modulus at 150 percent elongation of less than 50 pounds per square inch.

The hydroxyl endblocked polydiorganosiloxanes (A) can have a viscosity at 25° C. of from 150 to 25,000 cs., preferably from 1,000 to 10,000 cs. The hydroxy endblocked polydiorganosiloxanes have organic groups selected from methyl, ethyl, vinyl, phenyl and 3,3,3-trifluoropropyl radicals. The organic groups of the polydiorganosiloxane contain no more than 50 percent phenyl or 3,3,3-trifluoropropyl radicals and no more than 10 percent vinyl radicals based on the total number of organic radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane and 3,3,3 - trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The methylvinyldi-(N-methylacetamido)silane, (C), is a key ingredient of the compositions of this invention. This amidosilane can be prepared by mixing a sodium salt of N-methylacetamide with methylvinyldichlorosilane in an inert organic solvent such as toluene, filtering the by-produced sodium chloride from the toluene product solution and thereafter removing the toluene by vacuum distillation to obtain the product, methylvinyldi-(N-methylacetamido)silane.

This method is further detailed in an application entitled "Method of Preparing Amidosilanes" by Louis H. Toporcer and Irvin D. Crossan, Ser. No. 293,606, filed on even date herewith and hereby incorporated by reference for the preparation of the amidosilane.

The aminosilanes, (D), have a general formula $$RSi(NR'R'')_3$$

in which R is a monovalent hydrocarbon radical including vinyl, phenyl and alkyl having 1 to 6 carbon atoms such as methyl, ethyl, n-propyl, isopropyl, n-butyl, isobutyl, pentyl and hexyl, R' is a hydrogen atom or an alkyl radical having 1 to 6 carbon atoms as illustrated above for R, and R'' is phenyl or an alkyl radical having 1 to 6 carbon atoms as illustrated above for R. These aminosilanes include, for example, methyltri(phenylamino)silane,
ethyltri(phenylamino)silane,
vinyltri(phenylamino)silane,
methyltr(n-butylamino)silane,
propyltri(n-butylamino)silane,
vinyltri(n-butylamino)silane,
phenyltri(dimethylamino)silane,
hexyltri(n-butylamino)silane,
methyltri(n-hexylamino)silane,
ethyltri(methylhexylamino)silane, and
pentyltri(n-pentylamino)silane.

These aminosilanes are known in the art and can be produced by known methods.

The amount of methylvinyldi-(N-methylacetamido)-silane, (C), in composition can be from 2 to 7.5 parts by weight per 100 parts by weight of polydiorganosiloxane (A). The amount of aminosilane (D), in the composition can be from 0.5 to 4 parts by weight per 100 parts by weight of polydiorganosiloxane (A). The composition of this invention cures to low modulus silicone elastomers such that the properties of the cured product when cured for seven days at 25° C. exposed to an air atmosphere having 50 percent relative humidity are an elongation of at least 600 percent as determined by ASTM D-412, a durometer on the Shore A scale of at least 8 as determined by ASTM D-2240-64T and a modulus at 150 percent elongation of less than 50 pounds per square inch (p.s.i.) as determined by ASTM D-412.

The amount of aminosilane (D) in the composition is sufficient enough to provide at least 5 weight percent of the combined weight of (C) and (D), but not more than 45 weight percent of the combined weight of (C) and (D). Amounts of aminosilane less than 5 weight percent of the combined weight of (C) and (D) provide compositions which have insufficient crosslinking after exposure to ambient conditions to be useful products and amounts of aminosilane greater than 45 percent of the combined weight of (C) and (D) provided compositions which cure to high modulus materials.

The compositions of this invention include both single package compositions where all the ingredients can be combined and stored in one package until cure is desired and two package compositions where the polydiorganosiloxane and filler are packaged in one container and the methylvinyldi(N - methylacetamido)silane and aminosilane are packaged in a second package and when cure is desired the contents of the two packages are combined. Although the ingredients for any composition can be put into any number of packages, it would be impractical to do so. Further, some of the compositions are not stable when packaged in one container for extended periods of time and thus must be packaged in two containers for shipping and storage.

The compositions of this invention which must be packaged in two containers for storage are those which contain from 2 up to 4 parts by weight of methylvinyldi-(N-methylacetamido)silane (C) per 100 parts by weight of polydiorganosiloxane (A) and from 0.5 to 1.5 parts by weight aminosilane (D) per 100 parts by weight of polydiorganosiloxane (A). Those compositions having less than 2 parts by weight (C) per 100 parts by weight (A) do not provide low modulus silicone rubber when exposed to curing conditions and those compositions containing less than 0.5 part by weight (D) per 100 parts by weight (A) do not have sufficient crosslinking to be useful low modulus silicone elastomers, for example, the products are cheesy or punky. Those two package compositions containing more than 1.5 parts by weight (D) per 100 parts by weight (A) provide high modulus products when exposed to curing conditions.

The compositions of this invention which can have all the ingredients packaged in one container for storage and shipping are those compositions which contain from 4 to 7.5 parts by weight methylvinyldi-(N-methylacetamido)silane, (C), per 100 parts by weight of polydiorganosiloxane (A) and from 0.5 to 4 parts by weight of aminosilane, (D), per 100 parts by weight, of polydiorganosiloxane (A). Additional limitations are imposed on the one package compositions with respect to the methylvinyldi-(N-methylacetamido)silane (C) and the aminosilane (D). In one package compositions, (C) is present in an amount sufficient enough to provide at least one silane molecule per hydroxyl of the polydiorganosiloxane (A). Further, the amount of aminosilane (D) is limited by the viscosity of the polydiorganosiloxane. Although this is not fully understood, it has been found that low modulus silicone elastomers can be obtained when the polydiorganosiloxane has a viscosity at 25° C. of 8,000 cs. or less, if the amount of aminosilane (D) present is sufficient enough to provide at least 5 weight percent of the total combined weight of (C) and (D) but not more than 30 weight percent of the total combined weight of (C) and (D) and when the polydiorganosiloxane has a viscosity at 25° C. greater than 8,000 cs., if the amount of aminosilane (D) present is at least 20 weight percent of the total combined weight of (C) and (D) but not greater than 45 weight percent of the total combined weight of (C) and (D). Compositions having less aminosilane than the above minimums provide products after exposure to curing conditions which have insufficient integrity to be useful low modulus silicone elastomers and those compositions which exceed the above maximums provide products after exposure to curing conditions which have high modulus.

The preferred one package compositions are those which have from 5 to 7 parts by weight methylvinyldi-(N-methylacetamido)silane per 100 parts by weight of (A) and from 1 to 3 parts by weight of aminosilane (D) per 100 parts by weight of (A).

The compositions of the present invention are stable upon storage whether they are one or two package compositions. Although it is not completely understood why the compositions of this invention are storage stable and prior art compositions are not particularly storage stable, nevertheless, compositions containing both the amidosilane and the aminosilane in the defined amounts provide storage stable compositions. This storage stability is particularly important for one package compositions.

The compositions of this invention are stored under anhydrous conditions because the amidosilane and aminosilanes are hydrolyzable when contacted by moisture. The compositions of the present invention are also adversely effected by acidic materials and thus the ingredients used in making the compositions of this invention should be neutral or basic to litmus paper when a small amount of the particular ingredient is placed in water.

The compositions of this invention can also contain fillers. The fillers can be present in amounts of from 0 to 150 parts by weight per 100 parts by weight of (A), preferably from 10 to 125 parts by weight filler per 100 parts by weight of (A). These fillers can be any non-acidic, non-reinforcing filler and include for example, calcium carbonate, ferric oxide, non-acidic carbon black, diatomaceous earth, alumina, hydrated alumina, titanium dioxide, glass Microballons, organic fillers, resins, such as silicone resins, crushed quartz, calcium sulfate and the like. Other conventional additives can be used as long as they are neutral or basic, including pigments, dyes, antioxidants, heat stability additives, and the like.

The low modulus room temperature vulcanizable silicone elastomer compositions of this invention can be prepared by mixing the defined ingredients. Those compositions which are two package compositions can be made by mixing the hydroxyl endblocked polydiorganosiloxane and filler, if used, and using this as one package and mixing the amidosilane and the aminosilane and using this as the second package. The aminosilane and amidosilane are mixed under essentially anhydrous conditions and stored under essentially anhydrous conditions until cure is desired. When cure is desired, the contents of the two packages are mixed and allowed to cure.

The compositions which can be used as one package compositions are preferably made by mixing the hydroxyl endblocked polydiorganosiloxane and filler, if used, to make a mixture with the filler well dispersed, termed a polymer base. A suitable polymer base can usually be obtained in one hour using commercial mixers. The resulting mixture is preferably deaired and then a mixture of the amidosilane and aminosilane is added and mixed with the polymer and filler mixture. This mixing is done under essentially anhydrous conditions and then the resulting mixture is preferably deaired and then a mixture under essentially anhydrous conditions. Once these one package compositions are made, they are stable for as long as one year if the essentially moisture free conditions are maintained, but will cure to low modulus silicone elastomers when exposed to moisture at room temperature. The most significant feature is the essentially anhydrous conditions required for mixing and storage wherein either or both the amidosilane and aminosilanes are involved.

The compositions of this invention when cured, provide elastomers having high elongation, such as, greater than 600% and values of 1,000 to 1,800% are not unusual with a modulus at 150% elongation of less than 50 pounds per square inch (p.s.i.). These low modulus silicone elastomers find utility in building construction, such as in sealing joints wherein the building materials sealed by these materials can expand and contract without breaking the seal. Another outstanding feature of the cured low modulus silicone elastomers of this invention is that the tear is a "knotty tear." A knotty tear refers to the type of tear propagation. The propagation in materials with a knotty tear will progress at sharp angles and thus instead of tearing along the entire length of a sealed joint and tear will progress across the width, for example, instead of the length of the joint. The low modulus silicone elastomers of this invention also have unprimed adhesion to many building materials. The compositions of this invention also have a rapid skin-over time which helps to keep the sealing material clean because it skins over rapidly, and dirt, which would ordinarily adhere to a tacky surface, if several hours lapse before skin-over, is avoided. The compositions of this invention are extrudable from containers directly to their use area.

The compositions of the present invention do not require a catalyst to aid in curing the compositions and it is observed that many of the conventional curing catalysts used in room temperature vulcanizable silicone elastomer compositions are detrimental to the curing of the compositions.

The following examples are presented for illustrative purposes only and should not be construed as limiting the invention which is delineated in the claims.

Preparation of methylvinyldi-(N-methylacetamido)silane: A flask equipped with a stirrer, nitrogen sweep, condenser and addition funnel was charged with 300 g. of dry toluene and 250 g. of a toluene slurry of sodium salt of N-metrylacetamide having 41 weight percent sodium salt of N-methylacetamide. To this slurry, 70 g. of methylvinyldichlorosilane was added over a 5 to 10 minute period while cooling with an ice-water bath. After the addition was completed, the mixture was heated to reflux and held at reflux for one hour. The resulting mixture was cooled to room temperature and passed through a filter containing filter aid to remove the by-produced sodium chloride from the solvent mixture. The salt filter cake was washed once with toluene and the wash was combined with the filtrate. The toluene was stripped from the filtrate using a Rinco evaporator to produce 99.5 g. of methylvinyldi-(N-methylacetamido)silane, a 93% yield. Analysis by gas liquid chromatography showed the product to be greater than 98% methylvinyldi-(N-methylacetamido)silane. The boiling point range was 85 to 88° C. at 1 mm. of Hg.

EXAMPLE 1

The following compositions were prepared by mixing the defined hydroxyl enblocked polydimethylsiloxane with a commercially available calcium carbonate filler, if present, and thereafter adding a mixture of the defined amidosilane and aminosilane thereto and mixing the entire composition under essentially anhydrous conditions. The resulting compositions were then put into containers for storage under essentially anhydrous conditions.

(A) 100 parts by weight of a hydroxyl enblocked polydimethylsiloxane having a viscosity at 25° C. of 4,000 cs., 100 parts by weight of calcium carbonate filler, dried, 7 parts by weight of methylvinyldi(N-methylacetamido)silane, and 0.5 parts by weight of methyltri-(n-butylamino)silane.

(B) Same as (A) above, except 1.0 part by weight of methyltri-(n-butylamino)silane used in place of 0.5 part by weight.

(C) Same as (B) above, except methyltri(phenylamino)silane is used in place of methyltri(n-butylamino)silane.

(D) Same as (C) above, except 1.5 parts by weight of methyltri(phenylamino)silane is used in place of 1.0 part by weight.

(E) 100 parts by weight of a hydroxyl endblocked polydimethylsiloxane having a viscosity at 25° C. of 12,500 cs., 90 parts by weight of calcium carbonate filler, used as received, 7 parts by weight of methylvinyldi-(N-methylacetamido)silane, and 3 parts by weight of methyltri-(n-butylamino)silane.

(F) Same as (E) above, except 6 parts by weight of methylvinyldi-(N-methylacetamido)silane used in place of 7 parts by weight.

(G) Same as (F) above, except 2 parts by weight of methyltri-(n-butylamino)silane used in place of 3 parts by weight.

(H) 100 parts by weight of the polydimethylsiloxane defined in (A) above, 110 parts by weight of calcium carbonate filler, used as received, 6 parts by weight of methylvinyldi-(N-methylacetamido)silane, and 0.8 part by weight of methyltri-(n-butylamino)silane.

(I) Same as (H) above, except 1.0 part by weight methyltri(n-butylamino)silane in place of 0.8 part by weight.

(J) Same as (H) above, except 1.5 parts by weight of methyltri-(n-butylamino)silane in place of 0.8 part by weight.

(K) Same as (H) above, except 4 parts by weight of methylvinyldi-(N-methylacetamido)silane used in place of 6 parts by weight.

(L) Same as (J) above, except 4 parts by weight of methylvinyldi-(N-methylacetamido)silane used in place of 6 parts by weight.

(M) 100 parts by weight of the polydimethylsiloxane defined in (A) above, 4 parts by weight of methylvinyldi-(N-methylacetamido)silane, and 1.6 parts by weight of methyltri(phenylamino)silane.

(N) Same as (M) above, except 0.6 part by weight of methyltri-(n-butylamino)silane used in place of 1.6 parts by weight of methyltri(phenylamino)silane.

The above compositions each had extended shelf life of greater than one month. The properties of the above compositions were determined as follows, wherein the properties of the cured elastomers were determined on samples cured for seven days at 25° C. at 50% relative humidity. Each of the cured elastomers were low modulus elastomers. The extrusion rate was determined by Military Specification Mil–S–7502 with the results in grams per minute (gms./min.). The durometer was determined by ASTM D–2240–64T on the Shore A scale. The tensile strength at break, elongation at break and 150% modulus were determined by ASTM D–412 with the results in pounds per square inch (p.s.i.), percent extension and p.s.i. respectively. The tear strength, Die "B," was determined by ASTM D–624 with the results in pounds per inch (p.s.i.). The skin-over time was determined by observing the time lapsed between the deposition of the composition with exposure to ambient moisture and the point at which the surface was dry to a light touch with a finger. The properties were as shown in Table I.

Components 1 and 2 mixed to provide a composition having a ratio of 210 parts of Component 1 to 3.5 parts by weight of Component 2.

(D)

Component 1: Polydimethylsiloxane defined in Example 1, Composition (A).
Component 2: 3 parts by weight of methylvinyldi-(N-methylacetamido)silane and 0.6 part by weight of phenyltri(dimethylamino)silane.

Components 1 and 2 mixed to provide a composition having a ratio of 100 parts by weight Component 1 to 3.6 parts by weight of Component 2.

(E)

Component 1: Polydimethylsiloxane defined in Example 1, Composition (A).
Component 2: Same as (D) above, except 1.0 part by

TABLE I

| Composition | Extrusion rate, grams minute | Durometer, Shore A | Tensile strength at break, p.s.i. | Elongation at break, p.s.i. | 150% modulus, percent | Tear strength, die "B", p.p.i. | Skin-over time, minutes | Room temperature shelf-life, months |
|---|---|---|---|---|---|---|---|---|
| A | 420 | 8 | 72 | 1,750 | 18 | 23 | 18 | >9 |
| B | 230 | 18 | 120 | 1,350 | 32 | 17 | 13 | >9 |
| C | 320 | 8 | 21 | 1,700 | 12 | 7 | 25 | >9 |
| D | 310 | 9 | 38 | 1,950 | 11 | 12 | 22 | >9 |
| E | | 10 | | 1,500 | <50 | | | |
| F | | 12 | | 1,600 | <50 | | | |
| G | | 10 | | 1,400 | <50 | | | |
| H | | 8 | | 800 | <50 | | | |
| I | | 10 | | 1,200 | <50 | | | |
| J | | 8 | | 800 | <50 | | | |
| K | | 11 | | 1,500 | <50 | | | |
| L | | 14 | | 1,200 | <50 | | | |
| M | | | | | <50 | | | |
| N | | | | | <50 | | | |

EXAMPLE 2

The following compositions were prepared as follows unless indicated otherwise by mixing the hydroxyl endblocked polydimethylsiloxane and commercially available calcium carbonate, if present, to make one mixture and by mixing the aminosilane and the amidosilane to make another mixture. These two mixtures were stored in separate containers and when cure was desired, they were mixed under ambient conditions. These compositions cured to low modulus silicone elastomers.

(A)

Component 1: 100 parts by weight of the polydimethylsiloxane defined in Example 1, Composition (A), and 110 parts by weight of calcium carbonate filler, used as received.
Component 2: 2 parts by weight of methylvinyldi-(N-methylacetamido)silane and 0.8 part by weight of methyltri-(n-butylamino)silane.

Components 1 and 2 mixed to provide a composition having a ratio of 210 parts by Component 1 to 2.8 parts by weight of Component 2.

(B)

Component 1: Same as (A) above.
Component 2: same as (A) above, except 1.0 part by weight methyltri-(n-butylamino)silane used in place of 0.8 part by weight.

Components 1 and 2 mixed to provide a composition having a ratio of 210 parts of Component 1 to 3 parts of Component 2.

(C)

Component 1: Same as (A) above.
Component 2: Same as (A) above, except 1.5 parts by weight of methyltri-(n-butylamino)silane used in place of 0.8 part by weight.

weight of phenyltri(dimethylamino)silane used in place of 0.6 part by weight.

Components 1 and 2 mixed to provide a composition having a ratio of 100 parts by weight of Component 1 to 4 parts by weight of Component 2.

The properties were determined on cured low modulus silicone elastomer after curing the compositions for 7 days at 25° C. and 50% relative humidity. The results were determined as described in Example 1 and were as shown in Table II.

TABLE II

| Composition | Durometer, Shore A scale | Elogation, percent | Modulus at 150% elongation, p.s.i. |
|---|---|---|---|
| A | 12 | 1,200 | <50 |
| B | 17 | 1,400 | <50 |
| C | 22 | 1,000 | <50 |
| D | | | <50 |
| E | | | <50 |

That which is claimed is:
1. A composition which is curable to a silicone elastomer at room temperature consisting essentially of the product obtained by mixing
   (A) 100 parts by weight of a hydroxyl endblocked polydiorganosiloxane having a viscosity at 25° C. of from 150 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals,
   (B) 0 to 150 parts by weight of a non-acidic, non-reinforcing filler, (C) 2 to 7.5 parts by weight inclusive methylvinyldi-(N-methylacetamido)silane, (D) 0.5 to 4 parts by weight inclusive of an aminosilane of the general formula RSi(NR'R")$_3$ in which R is a monovalent hydrocarbon radical selected from the group consisting of an alkyl radical having from 1 to 6 carbon atoms inclusive, phenyl and vinyl, R' is a monovalent radical selected from the group consisting of a hydrogen atom and an alkyl radical having from 1 to 6 carbon atoms inclusive, R" is a monovalent hydrocarbon radical selected from the group consisting of an alkyl radical having from 1 to 6 carbon atoms inclusive and phenyl, said aminosilane (D) being present in an amount sufficient enough to provide at least 5 weight percent but not more than 45 weight percent of the total combined weight of (C) and (D), said composition when cured for seven days at 25° C. exposed to an air atmosphere having 50 percent relative humidity results in a silicone elastomer having an elongation of at least 600 percent, a durometer on the Shore A scale of at least 8 and a modulus at 150 percent elongation of less than 50 pounds per square inch.

2. The composition in accordance with claim 1 in which the polydiorganosiloxane is a polydimethylsiloxane.

3. The composition in accordance with claim 2 in which the non-acidic, non-reinforcing filler is present in an amount of from 10 to 125 parts by weight.

4. The composition in accordance with claim 3 in which the viscosity of the polydimethylsiloxane is from 1,000 to 10,000 cs. at 25° C.

5. The composition in accordance with claim 4 in which the methylvinyldi-(N-methylamido)silane (C) is present in an amount of from 2 up to 4 parts by weight per 100 parts by weight of (A) and the aminosilane (D) is present in an amount of from 0.5 to 1.5 parts by weight per 100 parts by weight of (A).

6. The composition in accordance with claim 5 in which the non-acidic, non-reinforcing filler is calcium carbonate.

7. The composition in accordance with claim 6 in which the aminosilane (D) is methyltri(n-butylamino)silane.

8. The composition in accordance with claim 6 in which the aminosilane (D) is phenyltri(dimethylamino)silane.

9. The composition in accordance with claim 6 in which the aminosilane (D) is present in an amount of from 1 to 1.5 parts by weight.

10. A composition which is stable in the absence of moisture but curable at room temperature upon exposure to moisture to a silicone elastomer consisting essentially of the product obtained by mixing under anhydrous conditions (A) 100 parts by weight of a hydroxyl endblocked polydiorganosiloxane having a viscosity at 25° C. of from 150 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, non-reinforcing filler, (C) 4 to 7.5 parts by weight inclusive of methylvinyldi-(N-methylacetamido)silane, said silane being present in an amount sufficient to provide at least one silane molecule per hydroxyl of the polydiorganosiloxane, and (D) 0.5 to 4 parts by weight inclusive of the aminosilane of the general formula RSi(NR'R")$_3$ in which R is a monovalent hydrocarbon radical selected from the group consisting of an alkyl radical having from 1 to 6 carbon atoms inclusive, phenyl and vinyl, R' is a monovalent radical selected from the group consisting of a hydrogen atom and an alkyl radical having from 1 to 6 carbon atoms inclusive, R" is a monovalent hydrocarbon radical selected from the group consisting of an alkyl radical having from 1 to 6 carbon atoms inclusive and phenyl, when the polydiorganosiloxane has a viscosity at 25° C. of 8,000 cs. or less, the amount of said aminosilane (D) present is sufficient enough to provide at least 5 weight percent but not greater than 30 weight percent of the total combined weight of (C) and (D), when the polydiorganosiloxane has a viscosity at 25° C. greater than 8,000 cs., the amount of aminosilane (D) present is sufficient enough to provide at least 20 weight percent but not greater than 45 weight percent of the total combined weight of (C) and (D), said composition when cured for seven days at 25° C. exposed to an air atmosphere having 50 percent relative humidity results in a silicone elastomer having an elongation of at least 600 percent, a durometer on the Shore A scale of at least 8 and a modulus at 150 percent elongation of less than 50 pounds per square inch.

11. The composition in accordance with claim 10 in which the polydiorganosiloxane is a polydimethylsiloxane.

12. The composition in accordance with claim 11 in which the aminosilane (D) is methyltri-(n-butylamino)silane.

13. The composition in accordance with claim 11 in which the aminosilane (D) is methyltri(phenylamino)silane.

14. The composition in accordance with claim 11 in which the non-acidic, non-reinforcing filler is present in an amount of from 10 to 125 parts by weight.

15. The composition in accordance with claim 12 in which the non-acidic, non-reinforcing filler is present in an amount of from 10 to 125 parts by weight.

16. The composition in accordance with claim 13 in which the non-acidic, non-reinforcing filler is present in an amount of from 10 to 125 parts by weight.

17. The composition in accordance with claim 14 in which the viscosity of the polydimethylsiloxane is from 1,000 to 10,000 cs. at 25° C.

18. The composition in accordance with claim 15 in which the viscosity of the polydimethylsiloxane is from 1,000 to 10,000 cs. at 25° C.

19. The composition in accordance with claim 16 in which the viscosity of the polydimethylsiloxane is from 1,000 to 10,000 cs. at 25° C.

20. The composition in accordance with claim 17 in which silane (C) is present in an amount of from 5 to 7 parts by weight and aminosilane (D) is present in an amount of from 1 to 3 parts by weight.

21. The composition in accordance with claim 18 in which silane (C) is present in an amount of from 5 to 7 parts by weight and methyltri-(n-butylamino)silane (D) is present in an amount of from 1 to 3 parts by weight.

22. The composition in accordance with claim 19 in which silane (C) is present in an amount of from 5 to 7 parts by weight methyltri(phenylamino)silane (D) is present in an amount of from 1 to 3 parts by weight.

23. The composition in accordance with claim 20 in which the non-acidic, non-reinforcing filler is calcium carbonate.

24. The composition in accordance with claim 21 in which the non-acidic, non-reinforcing filler is calcium carbonate.

25. The composition in accordance with claim 22 in which the non-acidic, non-reinforcing filler is calcium carbonate.

26. A composition consisting essentially of a mixture prepared by mixing under anhydrous conditions a polymer base consisting essentially of (A) 100 parts by weight of a hydroxyl endblocked polydiorganosiloxane having a viscosity at 25° C. of from 150 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals.

(B) 0 to 150 parts by weight of a non-acidic, non-reinforcing filler, with a mixture of (C) methylvinyldi-(N-methylacetamido)silane and (D) an aminosilane of the general formula RSi(NR'R")₃ in which R is a monovalent hydrocarbon radical selected from the group consisting of an alkyl radical having from 1 to 6 carbon atoms inclusive, phneyl and vinyl, R' is a monovalent radical selected from the group consisting of a hydrogen atom, an alkyl radical having from 1 to 6 carbon atoms inclusive, and R" is a monovalent hydrocarbon atom selected from the group consisting of an alkyl radical having from 1 to 6 carbon atoms inclusive and phenyl, said silane (C) being present in an amount sufficient to provide from 4 to 7.5 parts by weight inclusive per 100 parts by weight of polydiorganosiloxane (A) and said silane (C) being present in an amount sufficient to provide at least one silane molecule per hydroxyl of the polydiorganosiloxane, said aminosilane (D) being present in an amount sufficient to provide from 0.5 to 4 parts by weight inclusive per 100 parts by weight polydiorganosiloxane (A), when the polydiorganosiloxane has a viscosity at 25° C. of 8,000 cs. or less the amount of said aminosilane (D) present is sufficient enough to provide at least 5 weight percent but not greater than 30 weight percent of the total combined weight of (C) and (D) when the polydiorganosiloxane has a viscosity at 25° C. greater than 8,000 cs., the amount of aminosilane present is sufficient enough to provide at least 20 weight percent but not greater than 45 weight percent of the total combined weight of (C) and (D), the resulting composition being stable in the absence of moisture but upon exposure to moisture cures to a silicone elastomer, when cured for seven days at 25° C. exposed to an air atmosphere having 50 percent relative humidity, the composition results in a silicone elastomer having an elongation of at least 600 percent, a durometer on the Shore A scale of at least 8 and a modulus at 150 percent elongation of less than 50 pounds per square inch.

References Cited
UNITED STATES PATENTS

| | | | |
|---|---|---|---|
| 3,032,528 | 5/1962 | Nitzsche et al. | 260—46.5 |
| 3,417,047 | 12/1968 | Golitz et al. | 260—46.5 G |
| 3,644,434 | 2/1972 | Hittmair et al. | 260—46.5 G |

DONALD E. CZAJA, Primary Examiner

M. I. MARQUIS, Assistant Examiner

U.S. Cl. X.R.

260—46.5 E, 46.5 G, 825

U.S. PATENT OFFICE
UNITED STATES PATENT OFFICE
CERTIFICATE OF CORRECTION

Patent No. 3,766,128            Dated: October 16, 1973

Sam A. Brady, Joseph N. Clark, Irvin D. Crossan and Louis H. Toporcer

It is certified that errors appear in the above-identified patent and that said Letters Patent are hereby corrected as shown below:

Column 9, line 69, "the" should read --an--.

Column 11, line 11, "phneyl" should read --phenyl--.

Signed and sealed this 9th day of April 1974.

(SEAL)
Attest:

EDWARD M. FLETCHER, JR.          C. MARSHALL DANN
Attesting Officer                Commissioner of Patents